United States Patent
Carolan et al.

(10) Patent No.: US 11,237,454 B2
(45) Date of Patent: Feb. 1, 2022

(54) SCALABLE FEEDBACK CONTROL OF SINGLE-PHOTON SOURCES FOR PHOTONIC QUANTUM TECHNOLOGIES

(71) Applicant: Massachusetts Institute of Technology, Cambridge, MA (US)

(72) Inventors: Jacques Johannes Carolan, Cambridge, MA (US); Uttara Chakraborty, Cambridge, MA (US); Nicholas C. Harris, Boston, MA (US); Mihir Pant, Mountain View, CA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 139 days.

(21) Appl. No.: 16/680,908

(22) Filed: Nov. 12, 2019

(65) Prior Publication Data

US 2020/0150511 A1 May 14, 2020

Related U.S. Application Data

(60) Provisional application No. 62/759,993, filed on Nov. 12, 2018.

(51) Int. Cl.
*H01S 3/094* (2006.01)
*G02F 1/35* (2006.01)
(Continued)

(52) U.S. Cl.
CPC .......... *G02F 1/3501* (2013.01); *G02F 1/3551* (2013.01); *G02F 1/365* (2013.01);
(Continued)

(58) Field of Classification Search
CPC ...... G02F 1/3501; G02F 1/3551; G02F 1/365; G02F 2202/20; G02F 2203/50;
(Continued)

(56) References Cited

U.S. PATENT DOCUMENTS 7,359,514 B2  4/2008  Trifonov et al.
8,532,411 B2  9/2013  Shimizu et al.
(Continued)

OTHER PUBLICATIONS

Sparrow et al., "Simulating the vibrational quantum dynamics of molecules using photonics." Nature 557.7707 (2018): 660. 8 pages.
(Continued)

*Primary Examiner* — Xinning(Tom) Niu
(74) *Attorney, Agent, or Firm* — Smith Baluch LLP

(57) ABSTRACT

Typically, quantum systems are very sensitive to environmental fluctuations, and diagnosing errors via measurements causes unavoidable perturbations. Here, an in situ frequency-locking technique monitors and corrects frequency variations in single-photon sources based on resonators. By using the classical laser fields used for photon generation as probes to diagnose variations in the resonator frequency, the system applies feedback control to correct photon frequency errors in parallel to the optical quantum computation without disturbing the physical qubit. Our technique can be implemented on a silicon photonic device and with sub 1 pm frequency stabilization in the presence of applied environmental noise, corresponding to a fractional frequency drift of <1% of a photon linewidth. These methods can be used for feedback-controlled quantum state engineering. By distributing a single local oscillator across a one or more chips, our approach enables frequency locking of many single photon sources for large-scale photonic quantum technologies.

17 Claims, 13 Drawing Sheets

(51) Int. Cl.
  H01S 3/08       (2006.01)
  H01S 3/13       (2006.01)
  H01S 3/067      (2006.01)
  H01S 3/23       (2006.01)
  G02F 1/355      (2006.01)
  G02F 1/365      (2006.01)
  H01S 3/083      (2006.01)
  H01S 3/16       (2006.01)

(52) U.S. Cl.
  CPC .......... *H01S 3/06791* (2013.01); *H01S 3/083* (2013.01); *H01S 3/08018* (2013.01); *H01S 3/094003* (2013.01); *H01S 3/094096* (2013.01); *H01S 3/13* (2013.01); *H01S 3/23* (2013.01); *G02F 2201/06* (2013.01); *G02F 2202/101* (2013.01); *G02F 2202/20* (2013.01); *G02F 2203/50* (2013.01); *H01S 3/1628* (2013.01); *H01S 3/1671* (2013.01)

(58) Field of Classification Search
  CPC ........... G02F 2201/06; G02F 2202/101; H01S 3/094096; H01S 3/08018; H01S 3/13; H01S 3/094003; H01S 3/06791; H01S 3/23; H01S 3/083; H01S 3/1671; H01S 3/1628
  See application file for complete search history.

(56) References Cited

U.S. PATENT DOCUMENTS

| | | | |
|---|---|---|---|
| 9,143,266 B2 | 9/2015 | Mower et al. | |
| 9,235,101 B2 | 1/2016 | Silverstone et al. | |
| 9,798,219 B2 | 10/2017 | Pant et al. | |
| 9,991,966 B1 | 6/2018 | Celo et al. | |
| 10,429,718 B2 | 10/2019 | Pant et al. | |
| 2013/0003766 A1* | 1/2013 | Savchenkov | G04F 5/14 372/38.01 |
| 2017/0075190 A1* | 3/2017 | Rudolph | G02F 1/365 |
| 2019/0341739 A1* | 11/2019 | Loh | H01S 3/302 |

OTHER PUBLICATIONS

Sun et al., "Single-chip microprocessor that communicates directly using light." Nature 528.7583 (2015): 534. 11 pages.
Thomson et al., "High contrast 40Gbit/s optical modulation in silicon." Optics Express 19.12 (2011): 11507-11516.
Vernon et al., "Strongly driven nonlinear quantum optics in microring resonators." Physical Review A 92.3 (2015): 033840. 17 pages.
Vernon et al., "Truly unentangled photon pairs without spectral filtering." Optics Letters 42.18 (2017): 3638-3641.
Wang et al., "Multidimensional quantum entanglement with large-scale integrated optics." Science 360.6386 (2018): 285-291.
Wang et al., "The influence of thermal and free carrier dispersion effects on all-optical wavelength conversion in a silicon racetrack-shaped microring resonator." Laser Physics 26.7 (2016): 075403. 8 pages.
Zhou et al., "On-chip light sources for silicon photonics." Light: Science & Applications 4.11 (2015): e358. 13 pages.
Zhu et al., "A scalable multi-photon coincidence detector based on superconducting nanowires." Nature nanotechnology 13.7 (2018): 596. 7 pages.
Zou et al., "Mid-infrared silicon photonic waveguides and devices." Photonics Research 6.4 (2018): 254-276.
Aaronson et al., "The computational complexity of linear optics." Proceedings of the forty-third annual ACM symposium on Theory of computing. ACM, 2011. 10 pages.
Akhlaghi et al., "Waveguide integrated superconducting single-photon detectors implemented as near-perfect absorbers of coherent radiation." Nature communications 6 (2015): 8233. 8 pages.
Aspuru-Guzik et al., "Photonic quantum simulators." Nature physics 8.4 (2012): 285. 7 pages.
Atabaki et al., "Integrating photonics with silicon nanoelectronics for the next generation of systems on a chip." Nature 556.7701 (2018): 349. 10 pages.
Bogaerts et al., "Silicon microring resonators." Laser & Photonics Reviews 6.1 (2012): 47-73.
Carolan et al., "Universal linear optics." Science 349.6249 (2015): 711-716.
Carolan et al., "Variational quantum unsampling on a quantum photonic processor." Nature Physics (2020): 1-6.
Carroll et al., "Photonic packaging: transforming silicon photonic integrated circuits into photonic devices." Applied Sciences 6.12 (2016): 426. 21 pages.
Carolan et al., "Scalable feedback control of single photon sources for photonic quantum technologies." Optica 6.3 (2019): 335-340.
Dive et al., "In situ upgrade of quantum simulators to universal computers." Quantum 2 (2018): 80. 12 pages.
Egger et al., "Adaptive hybrid optimal quantum control for imprecisely characterized systems." Physical Review Letters 112.24 (2014): 240503. 5 pages.
Ferrie et al., "Robust and efficient in situ quantum control." Physical Review A 91.5 (2015): 052306. 8 pages.
Fowler et al., "Surface codes: Towards practical large-scale quantum computation." Physical Review A 86.3 (2012): 032324. 48 pages.
Gimeno-Segovia et al., "From three-photon Greenberger-Horne-Zeilinger states to ballistic universal quantum computation." Physical Review Letters 115.2 (2015): 020502. 5 pages.
Grassani et al., "Energy correlations of photon pairs generated by a silicon microring resonator probed by Stimulated Four Wave Mixing." Scientific Reports 6 (2016): 23564. 6 pages.
Harris et al., "Efficient, compact and low loss thermo-optic phase shifter in silicon." Optics Express 22.9 (2014): 10487-10493.
Harris et al., "Integrated source of spectrally filtered correlated photons for large-scale quantum photonic systems." Physical Review X 4.4 (2014): 041047.10 pages.
Harris et al., "Quantum transport simulations in a programmable nanophotonic processor." Nature Photonics 11.7 (2017): 447. 7 pages.
Heuck et al., "Temporally and spectrally multiplexed single photon source using quantum feedback control for scalable photonic quantum technologies." New Journal of Physics 20.6 (2018): 063046. 14 pages.
Horst et al., "Cascaded Mach-Zehnder wavelength filters in silicon photonics for low loss and flat pass-band WDM (de-) multiplexing." Optics Express 21.10 (2013): 11652-11658.
Huh et al., "Boson sampling for molecular vibronic spectra." Nature Photonics 9.9 (2015): 615. 10 pages.
International Search Report and Written Opinion in International Patent Application No. PCT/US2019/060867 dated Jan. 27, 2020, 13 pages.
Judson et al., "Teaching lasers to control molecules." Physical Review Letters 68.10 (1992): 1500. 4 pages.
Kelly et al., "Optimal quantum control using randomized benchmarking." Physical Review Letters 112.24 (2014): 240504. 5 pages.
Kelly et al., "Scalable in situ qubit calibration during repetitive error detection." Physical Review A 94.3 (2016): 032321. 8 pages.
Klimov et al., "Fluctuations of energy-relaxation times in superconducting qubits." Physical Review Letters 121.9 (2018): 090502. 5 pages.
Laing et al., "High-fidelity operation of quantum photonic circuits." Applied Physics Letters 97.21 (2010): 211109. 4 pages.
Li et al., "Hybrid quantum-classical approach to quantum optimal control." Physical Review Letters 118.15 (2017): 150503. 5 pages.
Lin et al., "Mid-infrared integrated photonics on silicon: a perspective." Nanophotonics 7.2 (2017): 393-420.
Little et al., "Surface-roughness-induced contradirectional coupling in ring and disk resonators." Optics Letters 22.1 (1997): 4-6.
Lu et al., "Enhancing quantum control by bootstrapping a quantum processor of 12 qubits." NPJ Quantum Information 3.1 (2017): 45. 7 pages.
Michel et al., "High-performance Ge-on-Si photodetectors." Nature Photonics 4.8 (2010): 527. 8 pages.

(56) References Cited

OTHER PUBLICATIONS

Miquel et al., "Quantum computation with phase drift errors." Physical Review Letters 78.20 (1997): 3971. 4 pages.

Munro et al., "Maximizing the entanglement of two mixed qubits." Physical Review A 64.3 (2001): 030302. 4 pages.

Neville et al., "Classical boson sampling algorithms with superior performance to near-term experiments." Nature Physics 13.12 (2017): 1153. 7 pages.

O'Brien et al., "Photonic quantum technologies." Nature Photonics 3.12 (2009): 687. 9 pages.

O'Brien et al., "Quantum process tomography of a controlled-NOT gate." Physical Review Letters 93.8 (2004): 080502. 4 pages.

O'Brien, "Optical quantum computing." Science 318.5856 (2007): 1567-1570.

Padmaraju et al., "Wavelength locking and thermally stabilizing microring resonators using dithering signals." Journal of Lightwave Technology 32.3 (2013): 505-512.

Pant et al., "Rate-distance tradeoff and resource costs for all-optical quantum repeaters." Physical Review A 95.1 (2017): 012304. 14 pages.

Piekarek et al., "High-extinction ratio integrated photonic filters for silicon quantum photonics." Optics Letters 42.4 (2017): 815-818.

Rabitz et al., "Whither the future of controlling quantum phenomena?." Science 288.5467 (2000): 824-828.

Rahimi-Keshari et al., "Direct characterization of linear-optical networks." Optics Express 21.11 (2013): 13450-13458.

Rohde et al., "Error tolerance of the boson-sampling model for linear optics quantum computing." Physical Review A 85.2 (2012): 022332. 5 pages.

Rudolph et al., "Why I am optimistic about the silicon-photonic route to quantum computing." APL Photonics 2.3 (2017): 030901. http://aip.scitation.org/doi/10.1063/1.4976737. 20 pages.

Schuck et al., "Waveguide integrated low noise NbTiN nanowire single-photon detectors with milli-Hz dark count rate." Scientific Reports 3 (2013): 1893. 6 pages.

Seok et al., "Large-scale broadband digital silicon photonic switches with vertical adiabatic couplers." Optica 3.1 (2016): 64-70.

Shchesnovich, "Sufficient condition for the mode mismatch of single photons for scalability of the boson-sampling computer." Physical Review A 89.2 (2014): 022333. 9 pages.

Silverstone et al., "On-chip quantum interference between silicon photon-pair sources." Nature Photonics 8.2 (2014): 104. 5 pages.

Silverstone et al., "Silicon quantum photonics." IEEE Journal of Selected Topics in Quantum Electronics 22.6 (2016): 390-402.

\* cited by examiner

SCALABLE FEEDBACK CONTROL OF SINGLE-PHOTON SOURCES FOR PHOTONIC QUANTUM TECHNOLOGIES

CROSS-REFERENCE TO RELATED APPLICATION(S)

This application claims the priority benefit, under 35 U.S.C. § 119(e), of U.S. Application No. 62/759,993, which was filed on Nov. 12, 2018, and which is incorporated herein by reference in its entirety for all purposes.

GOVERNMENT SUPPORT STATEMENT

This invention was made with Government support under Grant Nos. FA9550-16-1-0391 and FA9550-14-1-0052 awarded by the U.S. Air Force Office of Scientific Research (AFOSR). The Government has certain rights in the invention.

BACKGROUND

Precise and robust control over individual quantum systems is a prerequisite for any scalable quantum technology. Reducing errors in physical qubits significantly reduces the resource overhead for full-scale error correction, making techniques for accurate device-level calibration and control paramount. Experimental parameters for high-fidelity control of a quantum device may vary between qubits and drift in time. Device-level feedback control techniques typically measure the qubit, estimate some fidelity metric, and feed back onto the control parameters to reduce the infidelity in a closed-loop manner. The success of these in situ control techniques hinges upon the efficiency and robustness of the fidelity estimator. While full quantum state tomography scales poorly, techniques such as randomized benchmarking, direct error detection, and efficient fidelity proxies have been used to guide the system to a desired state via quantum measurement.

SUMMARY

Here, we introduce an in situ control technique for photonic quantum technologies that tracks and corrects variations in single photon sources based on microring resonators (MRRs), without the need for destructive quantum measurements. Our technology makes use of a unique property of photonic quantum technologies where much of the error diagnosis and correction can be implemented via classical laser fields at high bandwidth, and with a high signal-to-noise ratio (SNR). Using the same laser fields that seed photon generation as local oscillators to diagnose cavity fluctuations, we develop a closed-loop protocol that corrects single photon frequency errors. Our technique can be implemented in a silicon (Si) quantum photonic device, and, by stabilizing on-chip cavities to sub-picometer levels at the direct current (DC) limit (corresponding to a fractional frequency drift of <1% of a cavity linewidth), correct static errors between photon sources, track and correct dynamic errors, and demonstrate feedback-controlled quantum state engineering. These corrections are performed in parallel to the quantum information processing and can be scaled to many thousands of optical components.

In this approach, a resonator, such as a looped waveguide (e.g., an MRR or ring) or resonant cavity (e.g., a distributed Bragg reflector, photonic crystal cavity, or microdisk resonator), is coupled to a bus waveguide such that light can couple between the two. The resonator (e.g., looped waveguide) is made of or includes a nonlinear material, such as a $\chi^2$ nonlinear material (e.g., lithium niobate or gallium arsenide) or a $\chi^3$ nonlinear material (e.g., silicon or silicon nitride). If the bus is pumped by a laser whose wavelength that meets the ring resonance condition (i.e., the optical path length of the loop is an integer number of wavelengths) then light will couple into the ring, which acts a resonator, enhancing the interaction of light with the waveguide material. Depending on the waveguide material, new quantum states of light may be generated. For example, in silicon, which is a $\chi^3$ material, single photons can be generated at the +n and −n resonances of the looped waveguide, conserving energy and momentum. Active control of the resonance of the ring may be provided by an on-chip modulator that varies the refractive index of the ring and therefore the ring's central resonance wavelength.

A large-scale photonic quantum device (e.g., for communication, sensing, computing, or simulation) may have many thousands of rings on the same chip, with the rings precisely tuned to the same wavelength, so that the generated photons have the same wavelength. Photons with different wavelengths reduce quantum interference, causing errors in the quantum information processing performed by the device. Aligning the resonant wavelengths of the rings is particularly hard in the presence of noise and cross-talk, which occur in realistic photonic systems.

Our approach uses MRRs to generate single photons at wavelengths different from the pump wavelength. A low-loss filter, such as an asymmetric Mach-Zehnder interferometer (MZI), separates the pump light and single photons based on the wavelength differences. (The filter does not have to be resonant and can therefore be less sensitive to fluctuations; for example, an asymmetric MZI has a very small wavelength-transmission response compared with a ring resonator.) An on-chip photodetector detects the filtered pump light. If the ring's resonance wavelength shifts, less pump light will be coupled into the ring, causing the power on the photodetector to increase. The photodetector output is fed back onto the ring to reduce or minimize the optical power on the photodiode. Because this frequency-stabilization process does not involve the single photons generated by the rings, it can be performed in parallel with the quantum computation and with a temporal overhead that is constant in the number of rings and hence scalable. Put differently, the frequency-stabilization process runs in the same amount of time regardless of the number of rings because it performs local optimization instead of global optimization).

This technique can be applied to any nonlinear optical process in a microring resonator where the pump is at a different wavelength from the generated photons. Here, we examine degenerate four-wave mixing (where the pump is at two different wavelengths, and the two photons are generated at the same wavelength). Other suitable nonlinear optical processes include non-degenerate four-wave mixing (pumping at one central wavelength, photons generated at different wavelengths); spontaneous parametric down-conversion; and frequency-conversion processes, which have wide applications in quantum technologies.

Our technology can be implemented entirely on chip, with low-loss filtering by asymmetric MZIs and photodiodes in a silicon photonic circuit and feedback electronics flip-chip bonded to the silicon photonic circuits. The feedback speed may be limited by the bandwidth of the modulator used in the feedback loop to tune the MRR resonance wavelengths, but even using relatively slow thermal phase shifters to tune the MRRs should yield bandwidths of about 100 kHz, which is faster than most noise sources. A pump beam from a single pump laser can then be distributed across an entire silicon photonic circuit such that hundreds, thousands, or even millions of rings may be aligned to a common local oscillator wavelength with an accuracy that is better than for pre-calculated noise sources (e.g., frequency stabilization of better than 1 pm). This enables feedback-controlled quantum state engineering, as explained below.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a single-photon source with scalable feedback control for in situ wavelength stabilization. A pump field is coupled into a Kerr-based resonator structure, which produces correlated photons via spontaneous four-wave mixing. The pump field is monitored via a photodiode whose output is fed back onto the resonator to stabilize the central frequency.

Figure 2A:
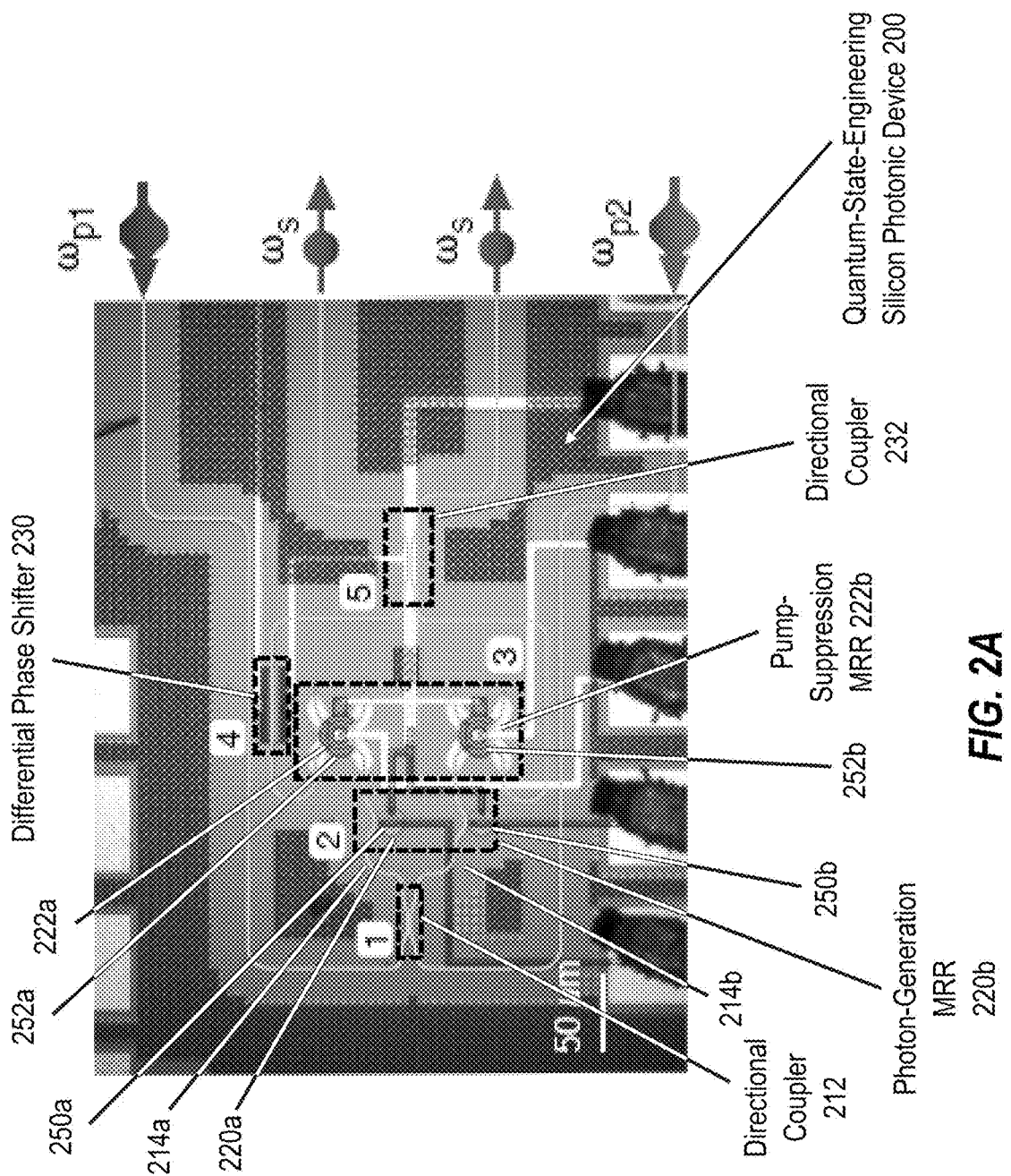

FIG. 2A is an optical micrograph of a quantum-state-engineering silicon photonic device which incorporates five thermo-optically controlled phases shifters and four MRRs (two for photon generation and two for pump suppression) in an area of just 0.08 mm$^2$. Marked components represent the five stages used for quantum state engineering: (1) pump mixing on a directional coupler, (2) photon generation in two MRRs, (3) partial pump suppression in two more MRRs, (4) differential phase shift, and (5) final directional coupler for quantum interference.

Figure 2B:
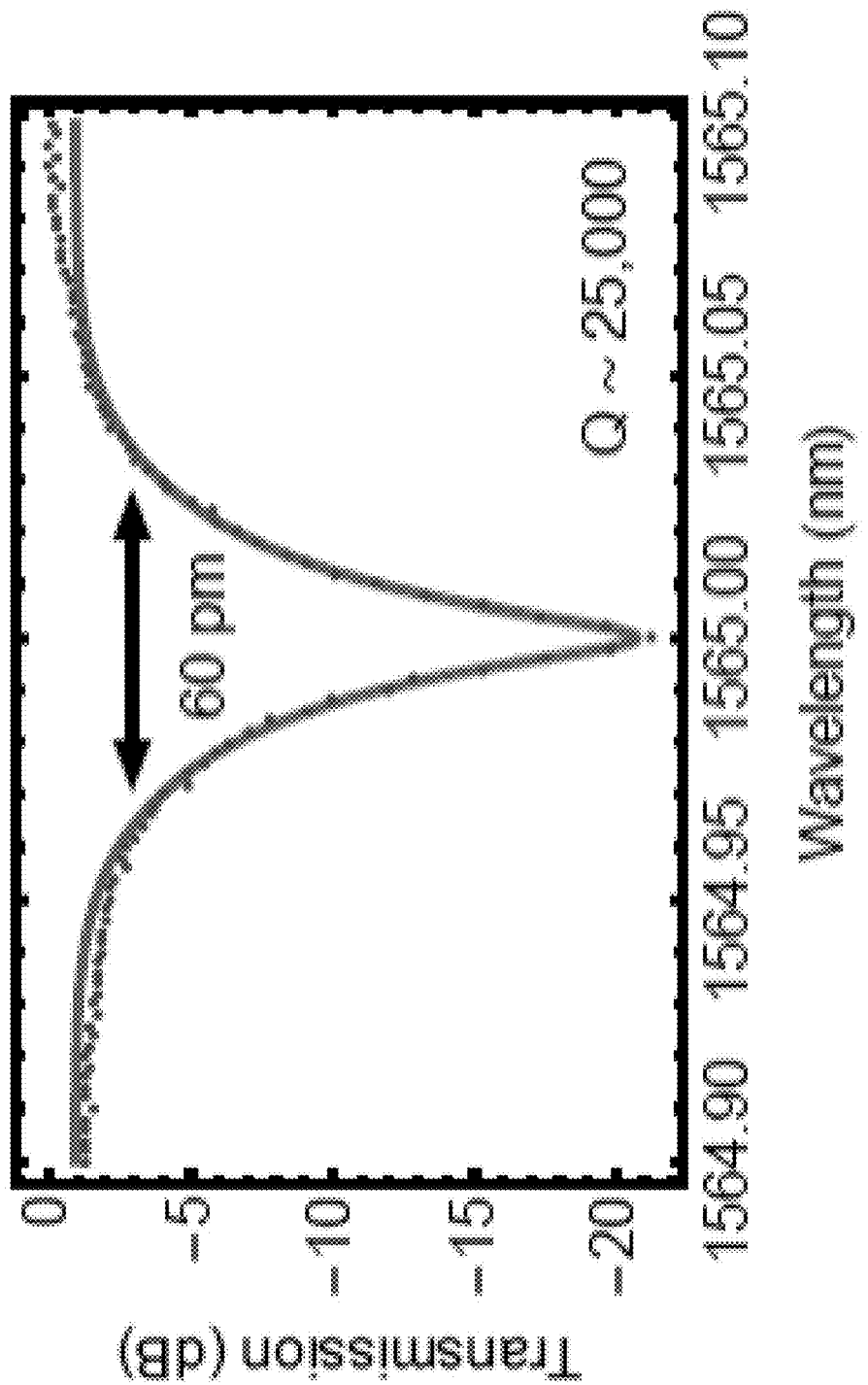

FIG. 2B shows the overlaid transmission spectra of the two photon-generation MRRs in the device of FIG. 2A aligned to a central resonance wavelength of 1565 nm alongside expected fit.

Figure 3A:
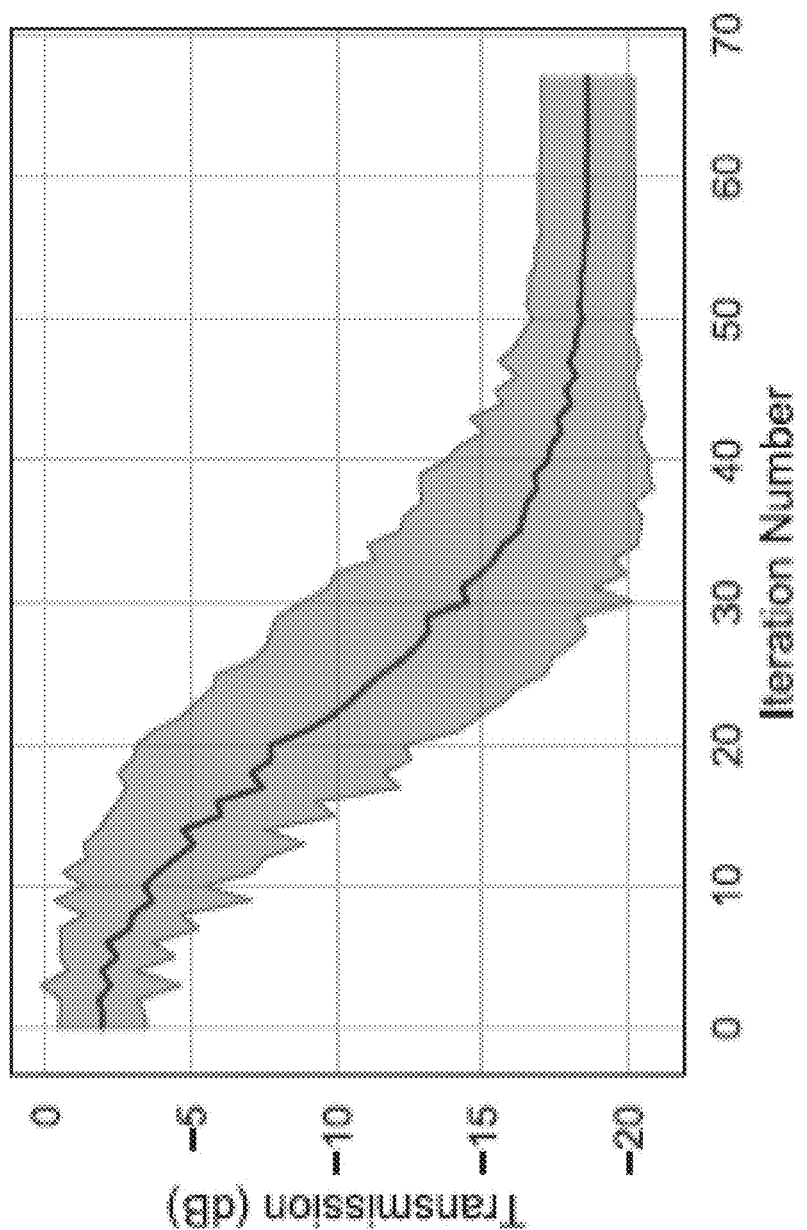

FIG. 3A is a plot of the mean of 66 instances of static frequency feedback correction, with initial guess voltages for each run randomly and independently chosen, in the device of FIG. 2A. The shaded region represents ±1σ. With the pump laser set to the desired alignment wavelength of λ=1565 nm, the voltage on each photon-generation MRR is selected to reduce or minimize the sum of the optical power in two output modes.

Figure 3B:
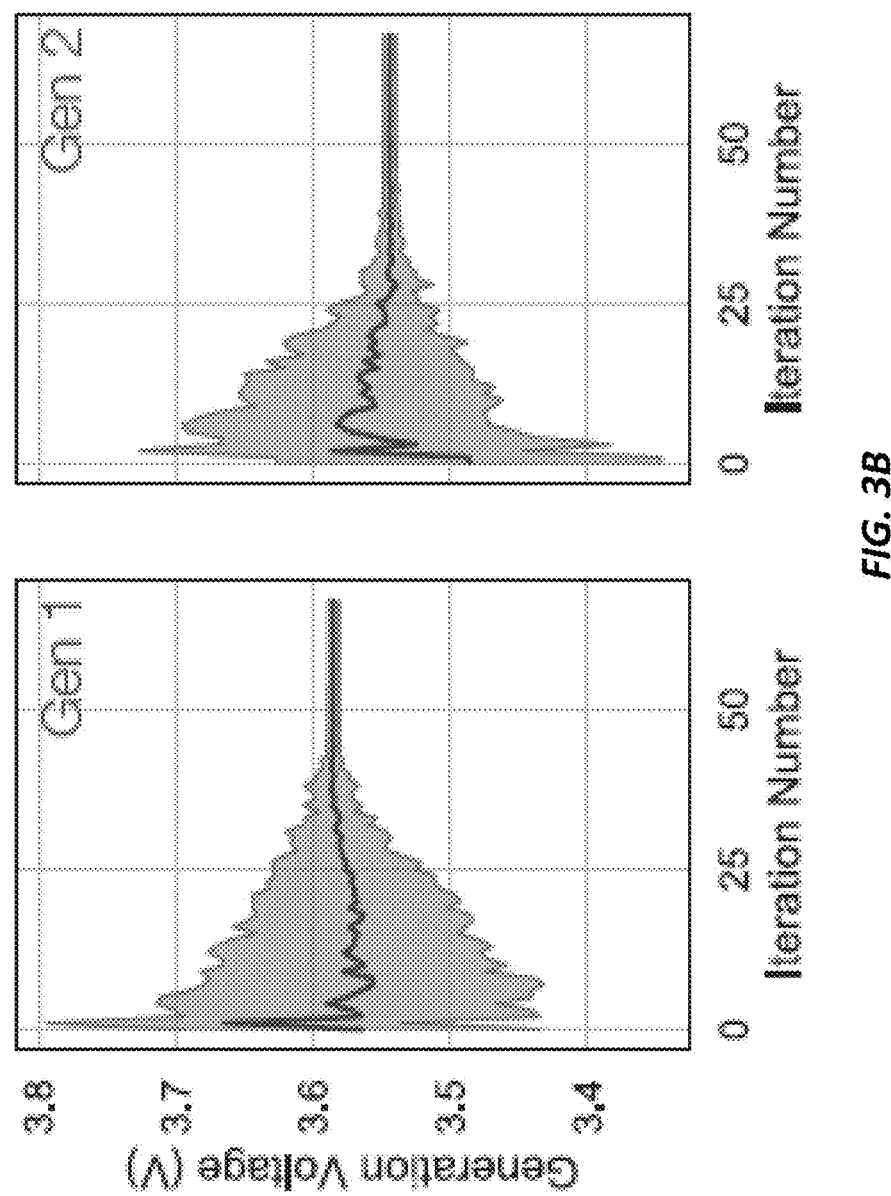

FIG. 3B is a plot of the mean change in voltages for each photon-generation MRR in the device of FIG. 2A during the 66 alignment protocols represented by FIG. 3A. Solution voltages vary between MRRs (a static offset due to fabrication variations) and over the course of the experiment due to a systematic change in laboratory conditions.

Figure 3C:
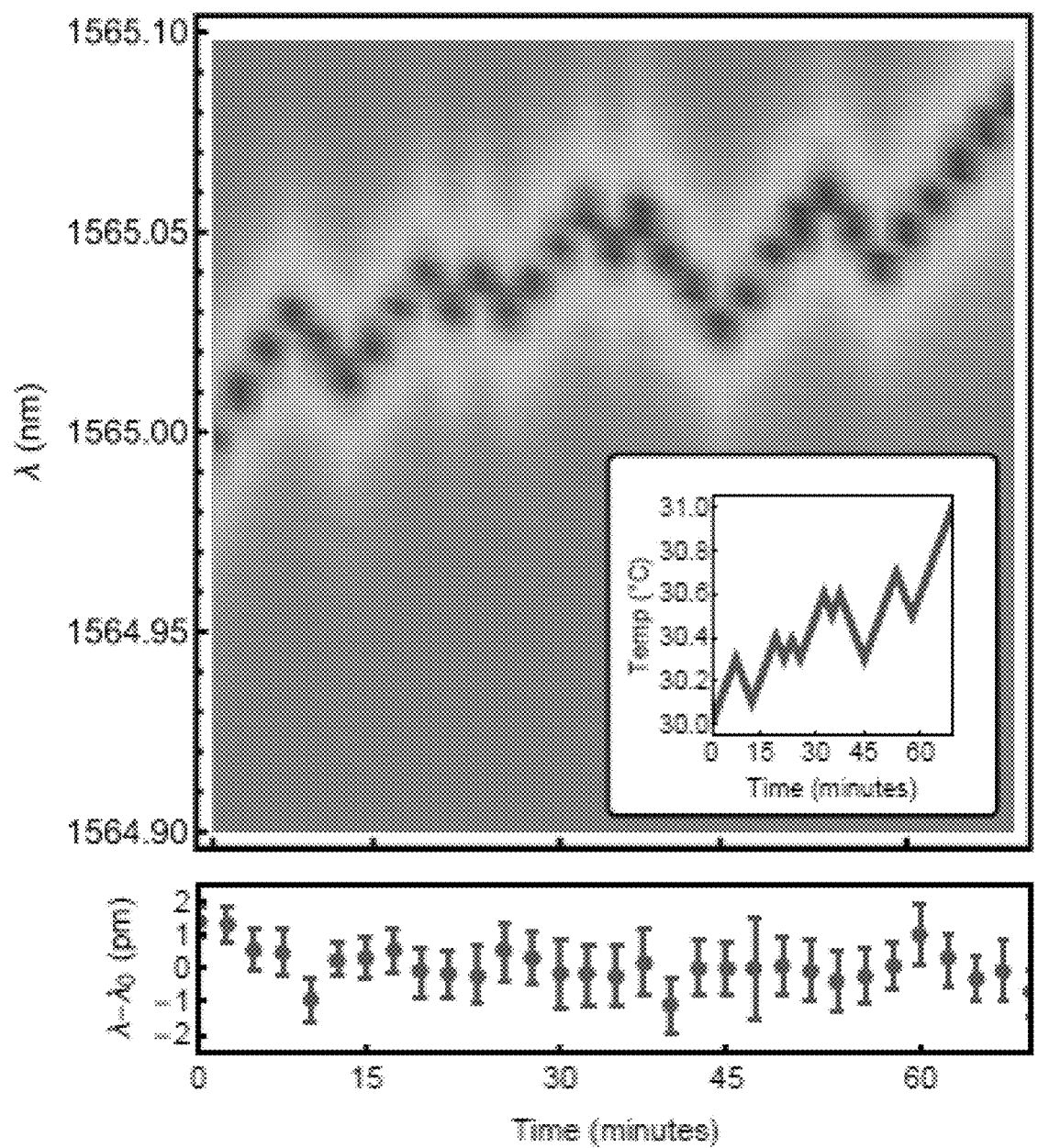

FIG. 3C is a spectrogram of the overlap of the resonance wavelengths of the MRRs in the device of FIG. 2A as a function of applied thermal noise (inset) over the course of one hour in the absence of dynamic stabilization. Given the same applied noise model, the lower plot shows the variation in central resonance when dynamic frequency stabilization is applied. Error bars are given by the error in the resonance fit.

Figure 3D:
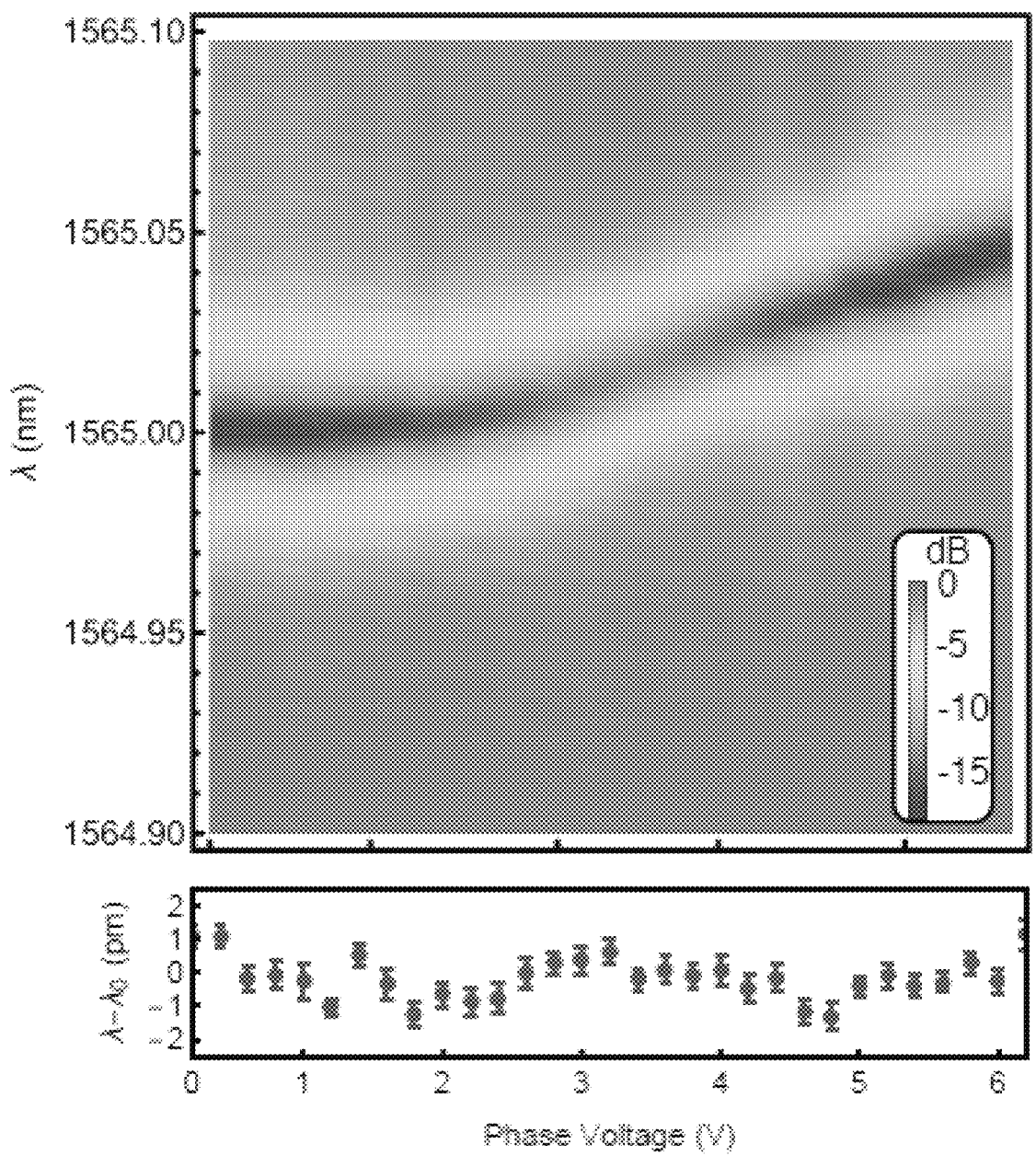

FIG. 3D is a spectrogram of the overlap of the resonance wavelengths of the MRRs in the device of FIG. 2A as a voltage is applied to an adjacent thermo-optic phase-shifter. Thermal cross-talk causes the resonance of the MRRs to shift, which should otherwise remain untouched by the phase shifter. The lower plot shows the variation when dynamic frequency stabilization is applied. In each instance the dynamic stabilization gives increases the resonance stability by two orders of magnitude.

Figures 4A, 4B:
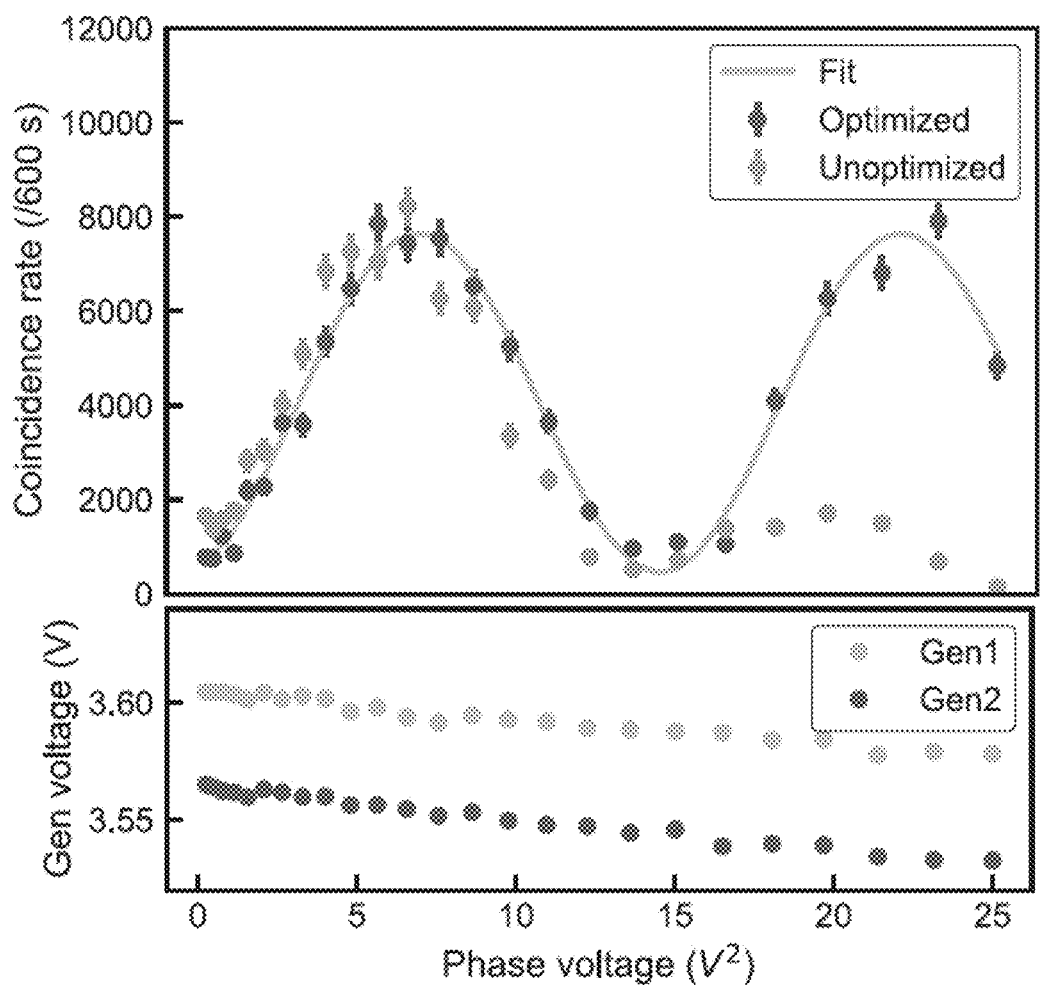

FIG. 4A is a plot of the coincidence count rate as a function of the square of the differential phase voltage, with (dark circles) and without (light circles) frequency stabilization, alongside a sinusoidal fit (line) in the device of FIG. 2A. Coincidences have been normalized for detector channel inefficiencies and error bars assume Poissonian counting statistics. The symmetry in the locked fringe can clearly be observed in comparison to the unlocked.

FIG. 4B is a plot of the variation in MRR control voltages over the course of the differential phase sweep when frequency locking is applied in the device of FIG. 2A.

Figure 4C:
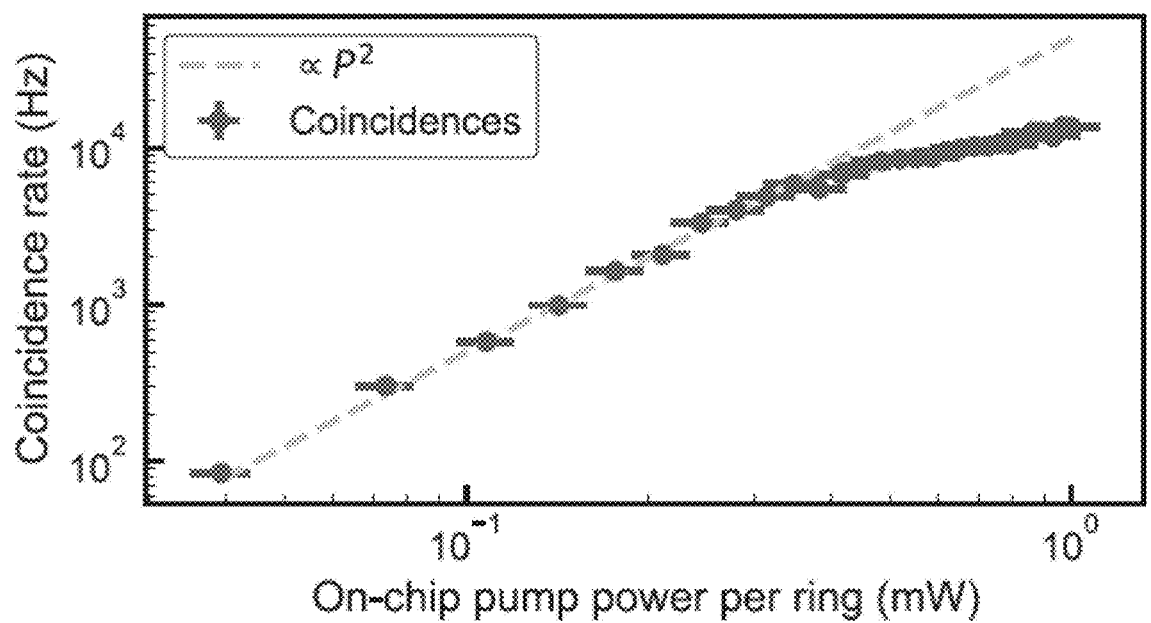

FIG. 4C is a plot of the coincidence count rate as a function of input power per ring (points) and an expected quadratic dependency based on a purely four-wave mixing process (line).

Figures 5A, 5B:
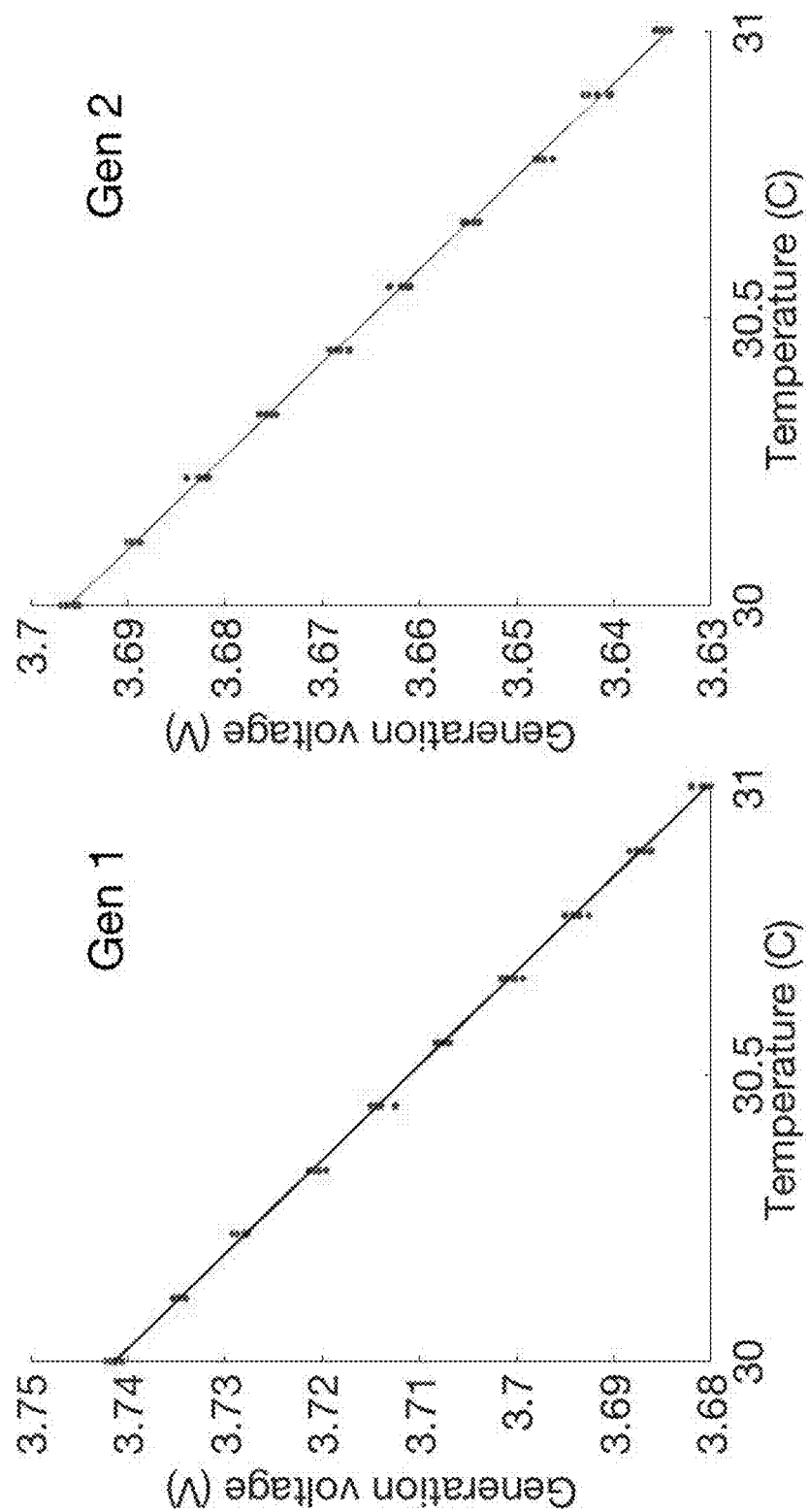

FIGS. 5A and 5B show photon-generation-MRR phase-shifter voltage versus temperature for the two photon-generation microring resonators in the device of FIG. 2A.

Figures 6A, 6B:
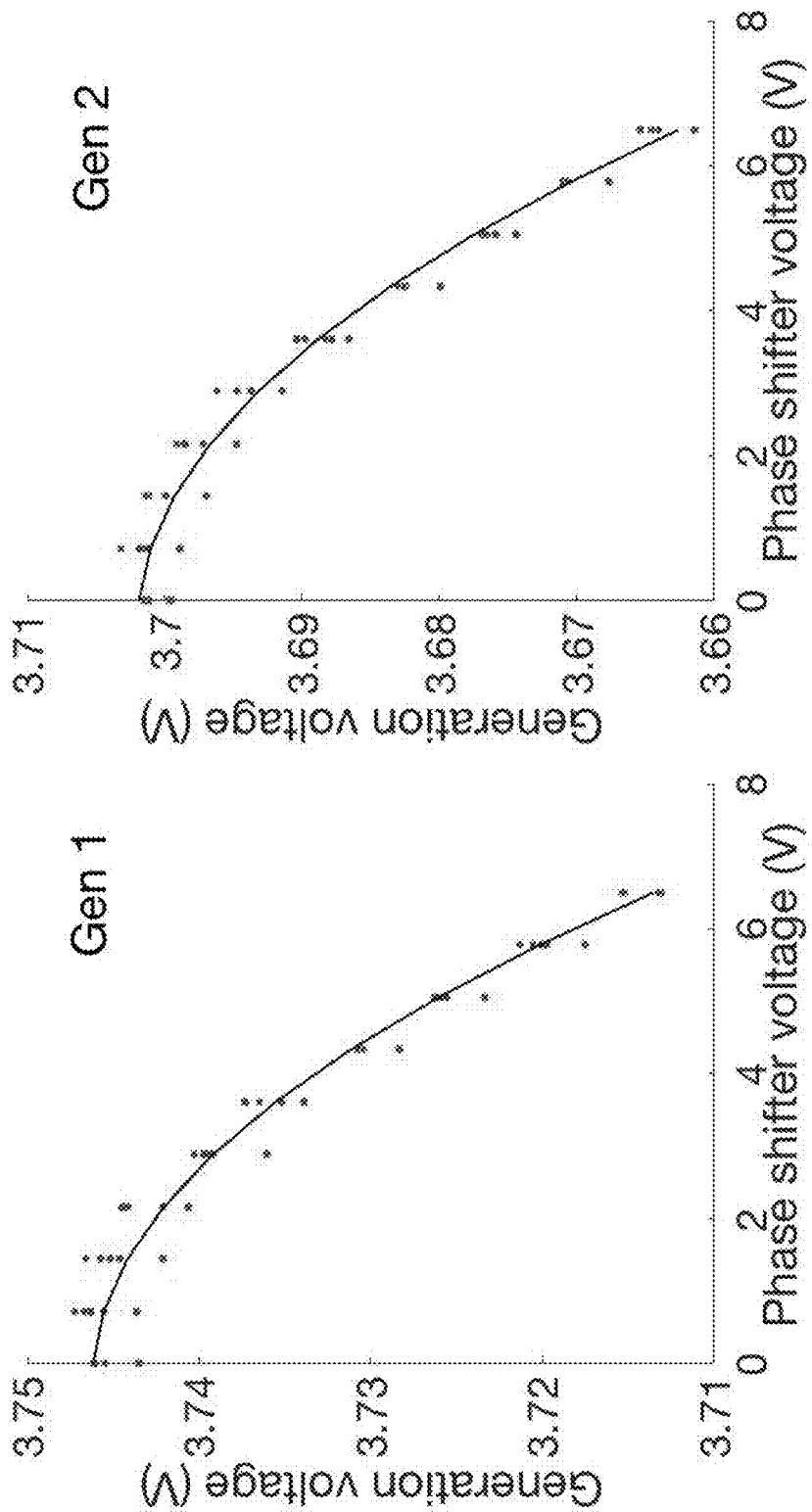

FIGS. 6A and 6B show photon-generation-MRR phase-shifter voltage versus differential phase shifter voltage for the two photon-generation microring resonators in the device of FIG. 2A.

DETAILED DESCRIPTION

In photonic quantum technologies, single photons are generated via a nonlinear optical process, propagated through linear optical circuitry, and read out via single-photon detectors. Each of these components has been demonstrated within the silicon photonics platform providing a plausible route towards millions of quantum optical components within a single wafer. As systems scale up, techniques for error mitigation in quantum optical devices have become paramount. Tools have been developed for pre-characterization of circuitry via classical laser fields but until now, there have been no practical techniques for actively monitoring errors.

Microring resonators (MRRs) are a leading approach to generate ultra-bright and pure single photons via spontaneous four-wave mixing, with the resonance structure enabling directly engineered photon frequencies in a footprint with lateral dimensions of tens of microns. In the degenerate case, where the generated photons are at the same wavelength (e.g., as shown in FIG. 1D, discussed below), an MRR is pumped by two lasers tuned to $\omega_{p1}$ and $\omega_{p2}$, corresponding to the $+n^{th}$ and $-n^{th}$ resonances of the ring. (In this case, the MRR resonance frequency can be locked to the frequencies of both pump beams or to the frequency of just one pump beam if the pump frequencies are stable with respect to each other.) A photon at each frequency is spontaneously annihilated within the resonator to generate two correlated signal and idler photons at the frequency $\omega_{s,i}=(\omega_{p1}+\omega_{p2})/2$ in the $n=0^{th}$ resonance of the ring, conserving energy.

Generating correlated signal and idler photons simultaneously offers a significant advantage over generating them at different times. Photon generation through a nonlinear optical material is spontaneous (probabilistic). This makes it difficult to impossible to know when a photon is generated. Generating two photons generated together means that one photon can act as a herald, signaling the creation of the other photon, which can then be used for the computation.

In large-scale architectures, such as those used for quantum supremacy, quantum simulation, or quantum computing, many MRRs are tuned to precisely the same center resonance wavelength. Resonance wavelength misalignment between resonators reduces quantum interference; reducing quantum interference can cause errors on the photonic qubit. Moreover, the efficiency and brightness of these sources scale with the quality factor of the resonator, placing stringent demands on the stability of MRR structures. Fabrication variations may cause static errors in the resonance wavelengths of the MRRs, while variations in refractive index over time—e.g., due to thermal fluctuations, the introduction of carriers, electrical noise or cross-talk between devices—may introduce dynamic errors.

Our approach involves monitoring the pump frequency modes with a low-loss drop filter and photodiode. As mentioned briefly above, the MRR's central resonance is aligned with the signal photon wavelength, and the pump laser wavelengths are aligned with the MRR's ±n resonances. In other words, the pump laser wavelengths are separated by even integer number of MRR free spectral ranges (FSRs). If the central resonance wavelength of the resonator shifts, the signal and pump wavelengths drift off resonance, reducing the amount of pump light coupled into the MRR. This causes the optical power on the photodiode to increase, which in causes the photodiode to feed an electrical signal back onto the phase shifter in a closed-loop manner to decrease the optical power. That is, the feedback loop locks the pump wavelength(s) to the MRR's ±n resonances, thereby stabilizing the wavelength of the MRR's central ($0^{th}$) resonance.

This optical power reduction can be implemented in software (e.g., using computational optimization) or hardware (e.g., with lock-in amplifier). Our closed-loop process scales with a time complexity O(1) in the number of MRRs and may be bandwidth-limited by the phase shifter. Moreover, the classical probe signal provides a higher signal-to-noise ratio than direct detection of the photons.

A Single-Photon Source with Scalable Feedback for In-Situ Stabilization

Figure 1A:
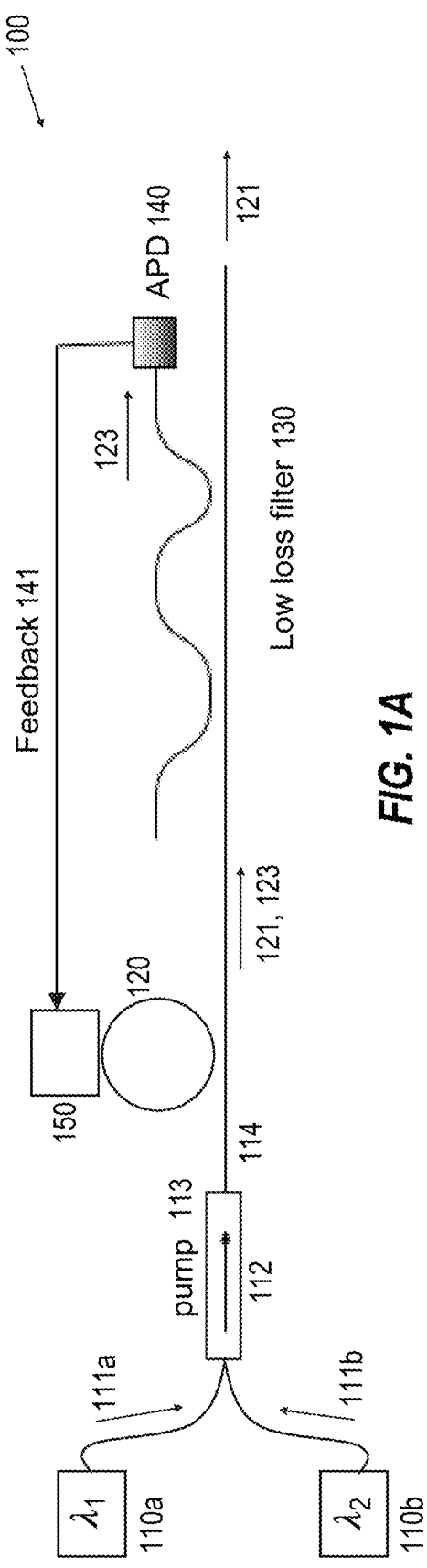
FIG. 1B illustrates applied voltage and optical power measurements in the architecture of FIG. 1A. The photodiode measures an initial optical power (1), if the resonance of the MRR shifts due to, say, thermal fluctuations, the power in the pump modes increases (2), which is then corrected via a closed loop feedback on the ring phase shifter (3).
FIG. 1C shows a chip with an integrated array of stabilized single-photon sources coupled to a switching matrix architecture. By distributing a single pump (local oscillator, LO) across an entire chip, many thousands of resonators can be frequency locked in parallel to enable large-scale quantum information processing (QIP).
FIG. 1D shows a transmission spectrum of a microring resonator (MRR) in a single-photon source. Pump lasers are tuned to the $(i-1)^{th}$ and $(i+1)^{th}$ resonance of the ring to generate two single photons at the $i^{th}$ resonance.

FIG. 1A shows a single-photon source 100 with feedback control of its output wavelength based on the intensity of unabsorbed pump light. The single-photon source 100 includes a pair of pump lasers 110a and 110b, which emit continuous-wave or pulsed pump light 111a and 111b at different wavelengths. A beam combiner 112 combines the pump light 111a and 111b from the pump lasers 110a and 110b into a single pump beam 113 that propagates along a bus waveguide 114.

The bus waveguide 114 is next to a looped waveguide, such as a microring resonator 120, that is made of or contains non-linear optical material, such as silicon or another a $\chi^2$ or $\chi^3$ nonlinear material. If implemented in silicon, the microring resonator 120 can have a quality factor Q of 10,000-100,000; lithium niobate microring resonators can have a quality factor Q of up to 1,000,000. Generally, the larger the quality factor Q, the larger the generation rate (cubicallly), but also the larger the sensitivity to fluctuations, hence motivating the need for feedback control techniques.

At least a portion of the pump beam 113 is evanescently coupled into the microring resonator 120, where it generates a pair of single photons 121 (a signal photon and an idler photon) through a degenerate four-wave mixing process. The coupling ratio depends on the loss in the microring resonator 120. Critical coupling occurs when the evanescent coupling into the microring resonator 120 is equal to the loss, implying a small amount (e.g., about 1%) should be coupled into the microring resonator 120. This could give the highest signal-to-noise ratio (SNR). If the microring resonator 120 is heavily over-coupled (e.g., with a coupling into the microring resonator 120 of about 90%), the extinction ratio may be very small. For a reasonable SNR, the coupling into the microring resonator 120 may be less than 50%.

When the microring resonator 120 is tuned correctly, its central resonance wavelength matches the single photons' wavelength, which is between the wavelengths of the pump lasers 110. Similarly, the wavelengths of the pump lasers 110 match the wavelengths of the microring resonator's ±n resonances, where n is a positive integer. The pump and signal/idler photon wavelengths can range anywhere from 700 nm to 1600 nm, depending on the material (e.g., 1100 nm to 1700 nm for silicon), with a wavelength spacing between pump/signal/idler as small as 0.8 nm and as large as about 100 nm. The single photons 121 as well any unabsorbed pump beam 123 are evanescently coupled from the microring resonator 120 to the bus waveguide 114.

The single photons 121 and remaining pump beam 123 propagate along the bus waveguide 114 to a low-loss filter 130, implemented in FIG. 1A as a Mach-Zehnder interferometer. The filter 130 is a notch or bandpass filter: it transmits light at the single-photon wavelength (i.e., light at wavelengths between the wavelengths of the pump lasers 110) and directs light at other wavelengths, including the wavelengths of the pump lasers 110, to a photodetector 140, shown in FIG. 1A as an avalanche photodiode (APD). Alternatively, the filter 130 may be a high-pass or low-pass filter that transmits light at the single-photon wavelength and directs light at one of the pump wavelengths to the photodetector 140. The photodetector 140 generates an electrical signal, such as a voltage, that is fed back to a device, such as a thermo-optic phase shifter 150, that tunes the resonance wavelength of the microring resonator 120 in response to fluctuations in the optical power on the photodetector 140.

Figure 1B:
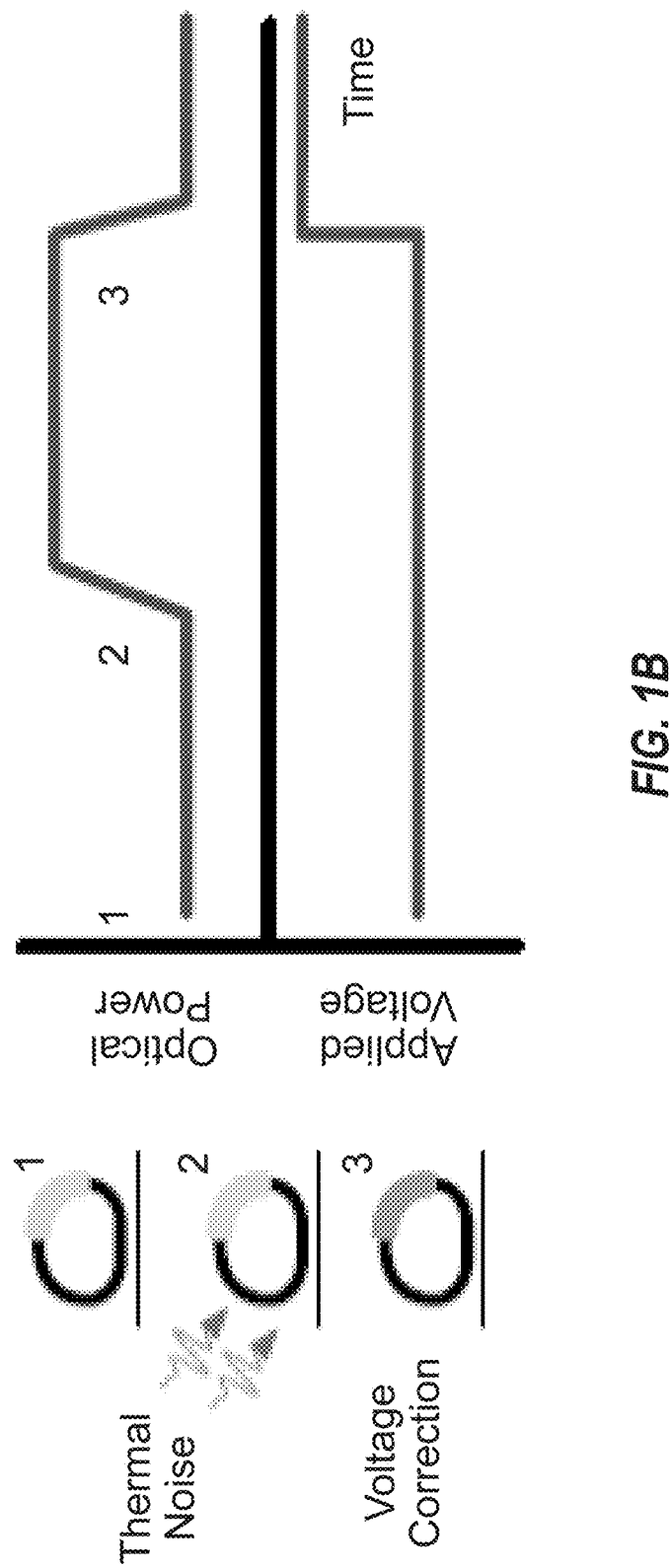
Figures 1C, 1D:
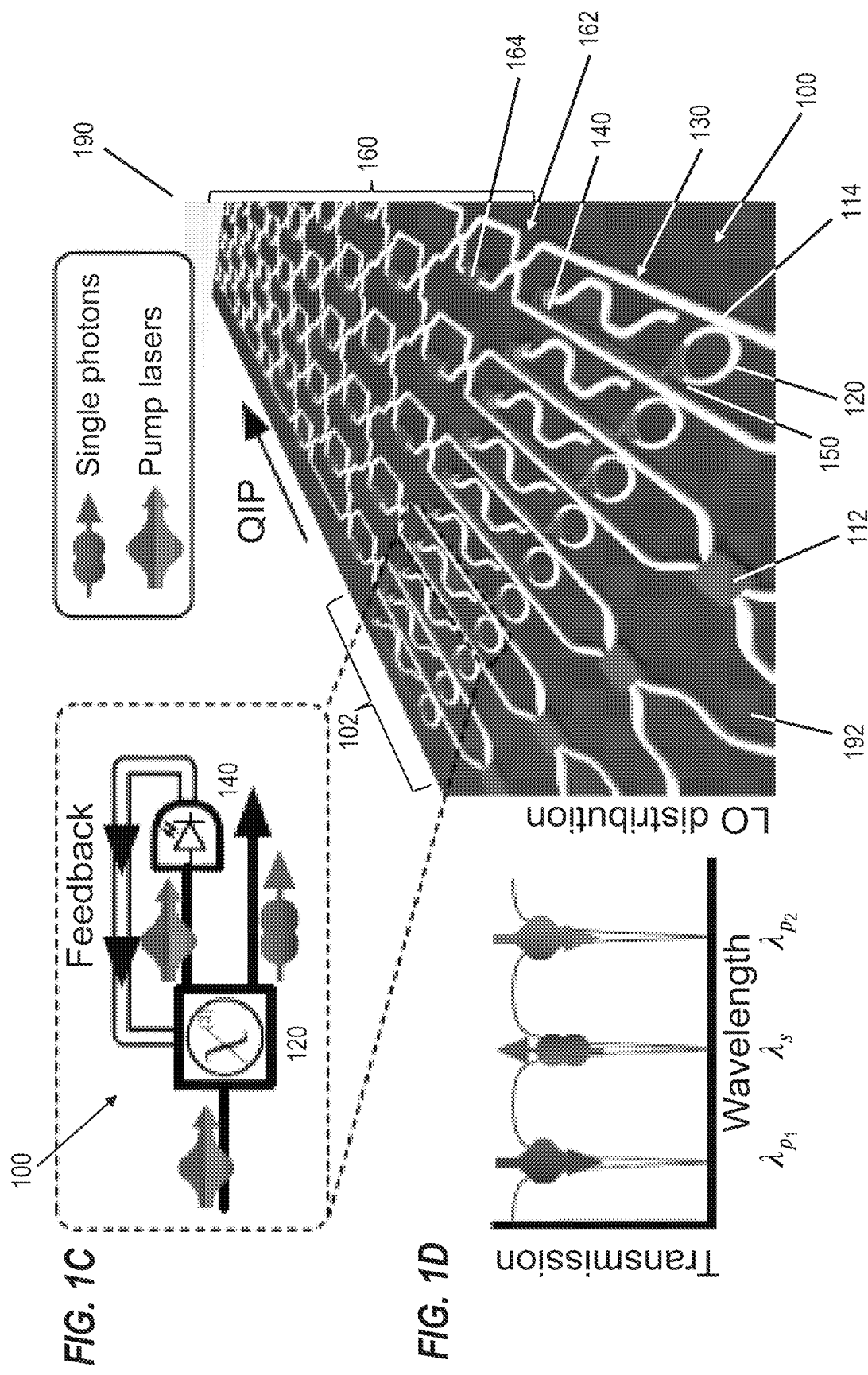

FIG. 1B illustrates a process for stabilizing or controlling the single-photon source 100 using the photodetector's output to tune the resonance wavelength of the microring resonator 120. In the absence of perturbations, the resonance wavelengths of the microring resonator 120 matches the wavelengths of the single photons 121 and the pump lasers 110 as shown in FIG. 1D. As a result, the nonlinear optical material in the microring resonator 120 converts more of the incoming pump beam 113 into single photons 121 via four-wave mixing (point 1 in FIG. 1B). If thermal noise causes the microring resonator 120 to expand or contract, the nonlinear material in the microring resonator 120 absorbs less of the incoming pump beam 113, making the four-wave mixing process less efficient. This causes the amplitude of the transmitted pump beam 123 to increase, which leads in turn to an increase in optical power sensed by the photodetector 140 (point 2 in FIG. 1B). The resulting increase in amplitude of the photodetector's output triggers a voltage correction applied to the thermo-optic phase shifter 150, which tunes the microring resonator's resonance wavelength to correct or compensate for the thermal noise (point 3 in FIG. 1B). This correction increases absorption of the pump beam 113, causing the four-wave mixing process to become more efficient and decreasing the optical power on the photodetector 140. Moreover, because the photodetector 140 monitors the unabsorbed pump power, the correction doesn't affect the single photons 121 emitted by the single-photon source 100.

Quantum Information Processing with Single-Photon Sources

FIG. 1C shows a photonic integrated circuit 190 with a one-dimensional array 102 of parallel single-photon sources 100. (The inset of FIG. 1C shows a schematic representation of one single-photon source 100.) The single-photon sources 100 in the array 102 are coupled to a switching matrix 160 of Mach-Zehnder interferometers 162, each of which has a coupling ratio that can be tuned with an electro-optic or thermo-optic phase shifter 164. The single-photon sources 100, Mach-Zehnder interferometers 162, and phase shifters 164 are integrated into to the same semiconductor substrate 192 (e.g., a silicon substrate).

FIG. 1D shows the transmission spectrum of one of the MRRs 120 in the array 102 of single-photon sources 100. The MRR's resonance wavelength $\lambda_s$ is between the pump wavelengths $\lambda_{p1}$ and $\lambda_{p2}$ so the single-photon source 100 generates a pair of signal photons through a degenerate four-wave mixing process as explained above. Generally, given tolerances typically seen in foundries for the material group index and ring length, the MRRs 120 have FSRs that don't vary appreciably over the photon generation wavelength range, which may be up to 100 nm.

In operation, the MRRs 120 of the single-photon sources 100 are tuned to the same resonance wavelengths as shown in the transmission spectrum plot of FIG. 1D. All of the single-photon sources 100 are pumped with light from the same pumps so they produce single photons that are coherent with each other. These single photons propagate through the switching matrix 160 according to the coupling ratios of the Mach-Zehnder interferometers 162 (e.g., by the voltages applied to the phase shifters 164). The settings may be selected to perform quantum information processing (QIP), quantum computing, quantum simulation, quantum communications, sensing, or generate a particular quantum state, e.g., as disclosed in U.S. Pat. No. 9,354,039, which is incorporated herein by reference in its entirety.

A Quantum State Engineering Silicon Photonic Device with Single-Photon Sources

FIG. 2A is a labeled micrograph of a quantum state engineering silicon photonic device 200 that works with off-chip pump separation and monitoring. The device 200 produces correlated pairs of photons via the inverse Hong-Ou-Mandel effect and comprises five stages as shown in FIG. 2A. The first stage mixes two pump beams from off-chip pump lasers (not shown) on a 50/50 directional coupler 212. Next, the mixed pumps impinge on a pair of photon-generation MRRs 220a and 220b (collectively, photon-generation MRRs 220) in respective arms of a Mach-Zehnder interferometer. The pump power is partially reduced via demux filters, implemented as pump-suppression MRRs 222a and 222b (collectively, pump-suppression MRRs 222) to prevent further photon generation in the waveguides yet remains at a level sufficient to be monitored via off-chip photodiodes (not state).

The state passes through a differential phase shifter 230, which imparts a differential phase φ. By operating in the weak pumping regime such that an appreciable probability exists only of producing two photons per generation event, the quantum state after the photon-generation MRRs 220 (and the differential phase shifter 230):

$$|\psi\rangle_{ring} = (|20\rangle_{1,2} + e^{i2\phi}|02\rangle_{1,2})/\sqrt{2}$$

where $|n\rangle_m$ represents n photons in the $m^{th}$ optical mode. Finally, the state is incident on another 50/50 directional coupler 232, which yields the state $$|\psi(\phi)\rangle_{out} = \cos\phi(|20\rangle - |02\rangle)/\sqrt{2} + \sin\phi|11\rangle \qquad (1)$$

Control of the differential phase therefore enables state engineering, including tuning between path entangled states (φ=0) and separable states (φ=π).

FIG. 2B shows the transmission spectrum of one of the photon generation MRRs. Each photon generation MRR 220 has with a linewidth Δλ=60 pm, yielding a quality factor of Q≈2.5×10⁴. Light was coupled into and out of the chip 200 via a custom-built silicon nitride optical interposer, which matched both the mode field diameter and pitch of the silicon waveguides that guide light throughout the chip 200 to give a loss of −2.5±0.5 dB per facet (error determined by multiple measurements). At the input, two tunable telecommunication lasers (not shown) were pre-filtered to reduce optical sidebands at the photon-generation wavelength. At the output, photons were first filtered with an external filter to enable pump monitoring and reduce background, then coupled into superconducting-nanowire single-photon detectors with about 75% quantum efficiency.

The chip 200 was fabricated in a standard CMOS silicon photonics process and contained two photon-generation MRRs 220, two pump-suppression or demux MRRs 222, and five thermo-optic phase shifters within an area of 0.08 mm². Each photon-generation MRR 220 has a radius R=11 μm and is evanescently coupled to a 500 nm wide×220 nm tall silicon bus waveguide 214a or 214b. Each ring has a quality factor of Q=2.5×10⁴ and a free spectral range FSR=8.8 nm. After 40 μm, the bus waveguide 214a (214b) is coupled to a demultiplexing/pump-suppression ring 222a (222b) (R=8 μm, FSR=12 nm) to separate single photons and pump light. The pump-suppression MRRs 222 have the same central resonance wavelength as the photon-generation MRRs 220 but different free spectral ranges so they can be tuned to transmit the signal photons but not the pump light or vice versa. The pump-suppression MRRs 222 couple at least some of the dropped pump light to photodetectors (off-chip; not shown) as described above for tuning the photon-generation MRRs 220. The single photons are routed via the drop port to a phase shifter and directional coupler for state engineering.

All four rings (i.e., both photon-generation MRRs 220 and both pump-suppression MRRs 222) are thermo-optically controlled by respective embedded resistive heaters 250a, 250b, 252a, and 252b formed by doped silicon regions contacting the metal interconnect layer. Here, all four rings 220 and 222 are tuned separately. To reduce losses due to free-carrier absorption, a low dopant concentration in the waveguide region overlapping with the optical mode is employed. The combination of both photon-generation rings 220 and demultiplexing rings 222 enables a pump suppression of 37 dB, mitigating further incoherent photon generation within the bus waveguides 214.

The experimental setup included two tunable telecom pump lasers (not shown) set to $\lambda_{p1}$=1587.1 nm and $\lambda_{p2}$=1551.8 nm, at +2 and −2 FSR of the tuned photon-generation rings, for degenerate-pair photon generation at $\lambda_{s,i}$=1569.1 nm. The pump laser beams pass through tunable bandpass filters, which provide a total of 100 dB suppression of unwanted sidebands occurring due to amplified spontaneous emission, and are locked to the ±2 resonances of the pump-generation MRRs 220 using off-chip photodetectors and electronics (not shown) as described above with respect to FIGS. 1A and 1B.

Laser light is edge coupled into the chip 200 via custom SiN interposers, which reduce the optical mode field diameter to better match the on-chip tapered mode converter (not shown), achieving an estimated loss per facet of −2.5±0.5 dB. The device 200 is mounted on top of a Peltier cooling unit to maintain thermal stability, and the thermo-optic phase shifters 250 and 252 are controlled by a custom-built, multi-channel digital-to-analog converter with 16-bit voltage precision. Both correlated photons and pump light are out-coupled and passed through narrow linewidth filters, which, along with on-chip filtering, provide a total pump suppression of about 100 dB. Photons are sent to two superconducting nanowire single-photon detectors with quantum efficiencies of η=75%, and the signals are time-tagged using a time-correlated single photon counting module.

Experimental Demonstration of Frequency-Locking Process

As a first test of our frequency-locking process, we correct static errors in the resonance position of the photon-generation rings which can occur due fabrication variations, such as waveguide surface roughness. In principle, accurate characterization of wavelength-voltage tuning curves can correct for this effect, but noise, such as thermal crosstalk and electrical noise, can complicate this process, hence the in situ approach. For this test the feedback correction process was run 100 times. Each run set the pump laser to the desired generation wavelength, and initial voltages for the two photon-generation rings were chosen randomly from normal distributions centered on 3.60 V and 3.56 V, respectively, with a standard deviation of 0.2 V. Computational optimization was used to arrive iteratively at the generation ring voltage combination that reduced or minimized the sum of the optical output powers of the MRRs as measured by an off-chip photodiode array. The gradient-free Nelder-Mead algorithm was empirically determined to converge quickly and be robust in the presence of experimental noise.

As shown in FIG. 3A, out of the 100 attempted runs, 62 succeed, with an average of 57 iterations to converge. FIG. 3B tracks the voltages of each generation MRR during optimization. The final voltage of each ring differs by 40 mV, demonstrating the benefits of static error correction. Moreover, repeatedly running this protocol over the course of 7 hours, we observed a total reduction in the voltages by 18 mV, possibly due to a systematic drift in laboratory temperature.

FIGS. 3C and 3D show simulations of two classes of dynamic error typically seen in photonic quantum systems: (1) environmental temperature fluctuations in FIG. 3C and (2) crosstalk between thermo-optic phase shifters in FIG. 3D. We induced temperature fluctuations by varying the chip temperature with an auxiliary Peltier control system onto which the device was mounted. In increments and decrements of 0.1° C., we programmed a random walk in temperature over the course of one hour for a net increase of 1° C.

The inset of FIG. 3C shows one instance of this random walk. The main plot in FIG. 3C is a spectrogram for the random walk in the inset. The spectrogram shows the shift in the central resonance of the MRRs over time as a result of this temperature variation in the absence of dynamic frequency stabilization and in the presence of our in situ approach. The implementation of our stabilization process leads to a standard deviation in the central resonance wavelength of 0.56 pm ($9.4\times10^{-3}\Delta\lambda$), compared to a total variation of 84.0 pm ($1.4\Delta\lambda$) in the absence of any correction. This corresponds to an increase in resonance stability of two orders of magnitude.

Similarly, we induced thermal crosstalk by sweeping the phase shifter voltage from 0 to 6.5 V. FIG. 3D shows the central wavelength shift in the uncorrected case (upper plot) and the in-situ corrected case (lower plot with error bars). Dynamic frequency stabilization yields a stability of 0.65 pm ($1.1\times10^2\Delta\lambda$), a 70-fold improvement compared with a total variation of 45 pm ($0.75\Delta\lambda$) in the uncorrected case.

We contrast the performance of our in situ correction technique with the results obtained using pre-determined tuning curve models (see below for details) to align the rings, with the same temperature or phase shifter voltage adjustment. After each adjustment, the generation ring voltages are set to the values according to the pre-determined functions. While alignment using pre-determined functions leads to a 15-fold and 5-fold improvement over the uncorrected case for the temperature error and voltage error, respectively, our iterative process outperforms the tuning curve-based correction by an order of magnitude in both instances. Moreover, our technique can naturally be applied to dynamic corrections where no noise model is known.

FIGS. 4A-4C illustrate an advantage of our in situ approach: it can be performed in parallel to the quantum computation. To demonstrate this, we applied our protocol to the task of quantum state engineering. According to Eq. (1), a linear variation in the differential phase ϕ causes a sinusoidal change in the probability amplitude of the |11⟩ state and a sine-squared change in the coincidence probability. Control of the thermo-optic phase shifter thus makes it possible to engineer the photonic quantum state directly.

FIG. 4A is a plot of photon coincidence rate versus the square of the differential phase voltage between the thermo-optic phase shifters for the first and second generation MRRs. FIG. 4B is a plot of the voltages applied to the thermo-optic phase shifters for the first and second generation MRRs versus the square of the differential phase voltage. In the absence of frequency control (FIG. 4A, Unoptimized), thermal cross-talk from the differential phase decouples the MRRs and causes an asymmetry in the interference fringe. To quantify this effect, we introduce the asymmetric contrast $C_{asy}=|C_1-C_2|/\max(C_1, C_2)$, which is the normalized difference between the coincidence counts $C_1$ at $\phi=\pi/2$ and counts $C_2$ at $\phi=3\pi/2$, where $C_{asy}=0$ in the ideal case. In the absence of correction, $C_{asy}=0.791$.

The frequency control protocol was implemented at each step of the phase sweep (FIG. 4A, Optimized), which corrected the generation voltages (FIG. 4B) and recovered the symmetry of the interference fringe, yielding a contrast $C_{asy}=5.61\times10^{-3}$. The quantum visibility quantifies the indistinguishability of the photons and is given by $V_q=(C_{max}-C_{min})/C_{max}$ where $C_{max}$ ($C_{min}$) is the maximum (minimum) measured coincidence count. The interference fringe is fitted (FIG. 4A, line) to account for the nonlinear phase-voltage relation of the thermo-optic phase shifter, and the quantum visibility is extracted as $V_q=0.938\pm0.021$. The deviation from unity visibility is primarily due to higher-order photon events, which are caused by the high pump power used to obtain a reasonable signal-to-noise ratio in the presence of lossy off-chip filters. The monolithic integration of lasers, single photon detectors, and filters may significantly reduce optical power constraints.

Finally, FIG. 4C shows the measured coincidence count rate as a function of the input pump power with $\phi=\pi/2$. At each optical power setting, we applied the frequency stabilization process to account for the refractive index change in the MRRs due to a combination of Kerr, thermal, and free-carrier dispersion effects. We reached an off-chip photon generation rate of 13.5 kHz (corrected for detector channel inefficiencies), which is primarily limited by two-photon absorption. This can be seen in FIG. 4C, which shows the measured coincidence count rate against the expected quadratic dependence (dashed line) with deviations at powers greater than 200 µW. The significant progress being made on mid-IR silicon photonics should mitigate the effect of two-photon absorption, which becomes negligible at wavelengths longer than 2.2 µm.

Microring Resonator (MRR) Transmission Model

Without being bound by any particular theory, modeling the transmission of coupled microring resonators shows that there is only one possible generation ring voltage combination that leads to a minimum in the rings' combined transmitted power. Hence there are no local minima that the Nelder-Mead search algorithm could potentially converge to. The transmission function of a single ring can be taken to be a Lorentzian:

$$T(\lambda) = \frac{-0.5\Gamma}{(\lambda - \lambda_{las})^2 + (0.5\Gamma)^2} \quad (2)$$

where $\Gamma$ and $\lambda_{las}$ are the width parameter and laser wavelength, respectively. The dependence of the rings' central wavelengths ($\lambda_1$ and $\lambda_2$) on ring voltages can be modelled as $$\lambda_1 = \lambda_{01} + \gamma_1 V_1^2 + \alpha_{12} V_2^2 \quad (3)$$

$$\lambda_2 = \lambda_{02} + \gamma_2 V_2^2 + \alpha_{12} V_1^2 \quad (4)$$

where $\lambda_{01}$ and $\lambda_{02}$ are the central resonances of the rings with no applied voltage tuning, $\gamma_1$ and $\gamma_2$ correspond to the strengths of the rings' resonance wavelength dependence on the voltage applied to the rings' phase shifters, and the coefficient $\alpha_{12}$ corresponds to the strength of the each ring's wavelength dependence on voltage applied to the other ring's phase shift. The voltage-squared dependence of the central wavelength on voltage arises from linearity of the wavelength shift with temperature, and hence with the dissipated power. In a physically realistic case, both the ratios $\gamma_1/\alpha_{12}$ and $\gamma_2/\alpha_{12}$ are much greater than both $(\lambda_{las}-\lambda_{01})/(\lambda_{las}-\lambda_{02})$ and $(\lambda_{las}-\lambda_{02})/(\lambda_{las}-\lambda_{01})$. The total transmission of two rings in series is the product of their individual transmissions:

$$T(\lambda_1, \lambda_2) = \left[\frac{-0.5\Gamma}{(\lambda_1 - \lambda_{las})^2 + (0.5\Gamma)^2}\right]\left[\frac{-0.5\Gamma}{(\lambda_2 - \lambda_{las})^2 + (0.5\Gamma)^2}\right] \quad (5)$$

and the total transmission in two rings in parallel is the sum of their individual transmissions:

$$T(\lambda_1, \lambda_2) = \frac{-0.5\Gamma}{(\lambda_1 - \lambda_{las})^2 + (0.5\Gamma)^2} + \frac{-0.5\Gamma}{(\lambda_2 - \lambda_{las})^2 + (0.5\Gamma)^2} \quad (6)$$

Both the series and parallel transmission functions have critical points where the conditions $\partial T/\partial \lambda_1=0$ and $\partial T/\partial \lambda_2=0$ hold. In order to satisfy both conditions, we set $V_1=0$ or $\lambda_1=\lambda_{01}+\gamma_1 V_1^2+\alpha_{12} V_2^2=\lambda_{las}$, and $V_2=0$ or $\lambda_2=\lambda_{02}+\gamma_2 V_2^2+\alpha_{12} V_1^2=\lambda_{las}$. Out of the four possible combinations, only one gives a minimum (the others are a maximum and saddle points):

$$\lambda_1=\lambda_{01}+\gamma_1 V_1^2+\alpha_{12} V_2^2=\lambda_{las} \quad (7)$$

$$\lambda_2=\lambda_{02}+\gamma_2 V_2^2+\alpha_{12} V_1^2=\lambda_{las} \quad (8)$$

Given the physically realistic stipulations on $\gamma_1$, $\gamma_2$, $\alpha_{12}$, $\lambda_{las}-\lambda_{01}$, and $\lambda_{las}-\lambda_{02}$ (i.e., the strength of a phase shifter coupling to its own ring is much greater than the same phase shifter's coupling to a nearby ring, and rings at zero voltage are close to the desired wavelength), the two equations above are guaranteed to have a solution with non-zero values of $V_1$ and $V_2$, which corresponds to tuning both rings to the laser wavelength. Hence, there is only one global minimum value of the transmission function for non-negative voltages, and no local minima. This guarantees that if the search converges, it will have converged to the true global minimum. This model may be generalized to an arbitrary number of ring resonators in series or parallel, such that the total transmission of N rings in series is given by $$T(\lambda_1, \lambda_2, \ldots, \lambda_{2N}) = \prod_{i=1}^{N} \frac{-0.5\Gamma}{(\lambda_i - \lambda_{las})^2 + (0.5\Gamma)^2} \quad (9)$$

and the total transmission in parallel by $$T(\lambda_1, \lambda_2, \ldots, \lambda_{2N}) = \sum_{i=1}^{N} \frac{-0.5\Gamma}{(\lambda_i - \lambda_{las})^2 + (0.5\Gamma)^2} \quad (10)$$

As in the two-ring case above, the sole minimum of the transmission function is achieved when all rings are individually tuned to the laser wavelength, and there are no local minima.

MRR Tuning Curves

FIGS. 5A and 5B show the measured phase-shifter voltage versus temperature for the first and second photon-generation rings, respectively. We obtained this data by sweeping the ring temperature, T, from 30° C. to 31° C. and iteratively aligning the rings' resonance wavelengths at each phase-shifter voltage using the Nelder-Mead algorithm.

Based on five sweeps, we obtained the following best-fit linear model for the dependence of the phase-shifter voltages on temperature:

$$V_1(T)=0.06090T+5.568 \quad (11)$$

$$V_2(T)=0.06166T+5.546 \quad (12)$$

FIGS. 6A and 6B show the measured phase-shifter voltage versus differential phase shifter voltage, $V_p$, for the first and second photon-generation rings, respectively. We obtained this data by sweeping the rings' phase-shifter voltage, $V_p$, from 0 volts to 6.5 volts and aligning the rings' resonance wavelengths at each phase-shifter voltage using the Nelder-Mead algorithm. Based on five sweeps, we obtained a best-fit quadratic model for the dependence of the rings' phase-shifter voltages on the differential phase shifter voltage:

$$V_1(V_p)=0.0007192V_p^2-0.0003439V_p+3.746 \quad (13)$$

$$V_2(V_p)=0.0008414V_p^2-0.0005760V_p+3.702 \quad (14)$$

Our in situ control technique for photonic quantum technologies uses the same classical laser fields used for photon generation as a probe to track, diagnose, and correct frequency variations in single-photon sources. Feedback control can be applied off-chip or in an integrated CMOS photonics platform. Electronic control circuitry either integrated on-chip or via flip-chip approaches allows large numbers of heralded single-photon sources to be frequency-locked to a common local oscillator. The combination of Kerr nonlinear optics in silicon rings with CMOS logic and single-photon detection could enable on-demand high fidelity single-photon sources based on multiplexed spontaneous four-wave mixing for all-optical quantum computing and quantum repeater architectures.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of generating frequency-stabilized single photons, the method comprising:
    pumping a microring resonator comprising a nonlinear material with a pump beam to generate a single photon;
    coupling the single photon and the pump beam out of the microring resonator;
    filtering the single photon from the pump beam;
    detecting an intensity of the pump beam; and
    tuning the microring resonator based on the intensity of the pump beam to stabilize a wavelength of a resonance of the microring resonator,
    wherein the pump beam comprises pump light at a first wavelength and pump light at a second wavelength greater than the first wavelength and the single photon is at a wavelength between the first wavelength and the second wavelength.

2. The method of claim 1, wherein tuning the microring resonator comprises locking the first wavelength to a wavelength of a +n resonance of the microring resonator, where n is a positive integer.

3. The method of claim 2, wherein tuning the microring resonator comprises locking the second wavelength to a wavelength of a −n resonance of the microring resonator.

4. The method of claim 1, wherein tuning the microring resonator comprises stabilizing the wavelength of the resonance to within 1 picometer of a desired wavelength.

5. The method of claim 1, wherein tuning the microring resonator comprises stabilizing the wavelength of the resonance to within 1% of a linewidth of the resonance.

6. The method of claim 1, wherein the microring resonator is a first microring resonator, the pump beam is a first pump beam, and the single photon is a first single photon, and further comprising:
    pumping a second microring resonator with a second pump beam to generate a second single photon;
    coupling the second single photon and the second pump beam out of the microring resonator;
    filtering the second single photon from the second pump beam;
    detecting an intensity of the second pump beam; and
    tuning the second microring resonator based on the intensity of the second pump beam to stabilize a resonance wavelength of the second microring resonator.

7. The method of claim 6, further comprising:
    emitting pump light from a laser; and
    splitting the pump light into at least part of the first pump beam and at least part of the second pump beam.

8. The method of claim 6, further comprising:
    adjusting a relative phase between the first single photon and the second single photon; and
    interfering the first single photon with the second single photon to produce an engineered quantum state.

9. A frequency-stabilized single-photon source comprising:
    a microring resonator with a nonlinear material to generate a single photon in response to being pumped with a pump beam;
    a filter, in optical communication with the microring resonator, to filter the single photon from the pump beam;
    a detector, in optical communication with the filter, to detect an intensity of the pump beam;
    a phase shifter, operably coupled to the detector and the microring resonator, to tune a wavelength of a resonance of the microring resonator based on the intensity of the pump beam;
    a first pump laser to generate pump light at a first wavelength;
    a second pump laser to generate pump light at a second wavelength greater than the first wavelength; and
    a beam combiner, in optical communication with the first pump laser and the second pump laser, to combine the pump light at the first wavelength and the pump light at the second wavelength to form the pump beam.

10. The frequency-stabilized single-photon source of claim 9, wherein the phase shifter is configured to lock the first wavelength to a wavelength of a +n resonance of the microring resonator, where n is a positive integer.

11. The frequency-stabilized single-photon source of claim 10, wherein the phase shifter is further configured to lock the second wavelength to a wavelength of a −n resonance of the microring resonator.

12. The frequency-stabilized single-photon source of claim 9, wherein the phase modulator is configured to stabilize the wavelength of the resonance to within 1 picometer of a desired wavelength.

13. The frequency-stabilized single-photon source of claim 9, wherein the phase modulator is configured to stabilize the wavelength of the resonance to within 1% of a linewidth of the resonance.

14. A frequency-stabilized single-photon source, comprising:
    a first microring resonator with a nonlinear material to generate a first single photon in response to being pumped with a first pump beam;
    a first filter, in optical communication with the first microring resonator, to filter the first single photon from the first pump beam;
    a first detector, in optical communication with the first filter, to detect an intensity of the first pump beam;
    a first phase shifter, operably coupled to the first detector and the first microring resonator, to tune a wavelength of a resonance of the first microring resonator based on the intensity of the first pump beam;
    a second microring resonator to generate a second single photon in response to being pumped with a second pump beam;
    a second filter, in optical communication with the second microring resonator, to filter the second single photon from the second pump beam;
    a second detector, in optical communication with the second filter, to detect an intensity of the second pump beam; and
    a second phase shifter, operably coupled to the second detector and the second microring resonator, to tune a resonance frequency of the second microring resonator based on the intensity of the second pump beam.

15. The frequency-stabilized single-photon source of claim 14, further comprising:

a differential phase shifter, in optical communication with the first filter, to adjust a relative phase between the first single photon and the second single photon; and a beam combiner, in optical communication with the phase shifter and the second filter, to interfere the first single photon with the second single photon to produce an engineered quantum state.

16. A photonic device comprising:

a substrate;

an array of microring resonators, integrated on the substrate and comprising $\chi^3$ nonlinear material, to generate single photons at a signal wavelength in response to being pumped with pump light at a first pump wavelength greater than the signal wavelength and a second pump wavelength less than the signal wavelength;

an array of filters integrated on the substrate, each filter in the array of filters in optical communication with a corresponding microring resonator in the array of microring resonators and configured to filter the single photon from light at the first pump wavelength and at the second pump wavelength coupled out of the corresponding microring resonator;

an array of detectors in optical communication with the array of filters, each detector in the array of detectors in optical communication with a corresponding filter in the array of filters and configured to detect an intensity of the light at the first pump wavelength and/or at the second pump wavelength filtered by the corresponding filter; and an array of thermo-optic modulators integrated on the substrate, each thermo-optic modulator in the array of thermo-optic modulators operably coupled to a corresponding detector in the array of detectors and in thermal communication with the corresponding microring resonator and configured to stabilize a resonance frequency of the corresponding microring resonator based on the intensity detected by the corresponding detector.

17. The photonic device of claim 16, further comprising:

an array of Mach-Zehnder interferometer, in optical communication with the array of microring resonators, to process the single photons from the microring resonators.

* * * * *